US012726840B2

(12) United States Patent
Liu et al.

(10) Patent No.: US 12,726,840 B2
(45) Date of Patent: Sep. 1, 2026

(54) SYSTEMS AND METHODS FOR NON-PUBLIC NETWORK (NPN) MEASUREMENT

(71) Applicant: ZTE Corporation, Shenzhen (CN)

(72) Inventors: Zhuang Liu, Shenzhen (CN); Dapeng Li, Shenzhen (CN); Jiren Han, Shenzhen (CN); Yin Gao, Shenzhen (CN); Man Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 270 days.

(21) Appl. No.: 18/678,339

(22) Filed: May 30, 2024

(65) Prior Publication Data

US 2024/0323723 A1 Sep. 26, 2024

Related U.S. Application Data

(63) Continuation of application No. PCT/CN2022/110677, filed on Aug. 5, 2022.

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS 12,526,727 B2* 1/2026 Godin .................. H04W 24/10
2021/0099924 A1* 4/2021 Shih ................. H04W 36/0061
2022/0345990 A1* 10/2022 Godin .................. H04W 24/10
2023/0199892 A1* 6/2023 Liu ....................... H04W 24/08 370/329
2024/0323723 A1* 9/2024 Liu ....................... H04W 24/08

FOREIGN PATENT DOCUMENTS

| | | | |
|---|---|---|---|
| CN | 111918308 | A | 11/2020 |
| EP | 4 142 342 | A1 | 3/2023 |
| JP | 2023-509942 | A | 3/2023 |
| WO | WO-2021/140127 | A1 | 7/2021 |
| WO | WO-2021/161265 | A1 | 8/2021 |
| WO | WO-2021/210846 | A1 | 10/2021 |
| WO | WO-2022/027167 | A1 | 2/2022 |

(Continued)

OTHER PUBLICATIONS

Foreign Action other than Search Report on Japanese Appl. No. 2024-532800 dated Nov. 21, 2025 (8 pages with English translation).

(Continued)

*Primary Examiner* — Faiyazkhan Ghafoerkhan
(74) *Attorney, Agent, or Firm* — Foley & Lardner LLP

(57) ABSTRACT

Presented are systems and methods for non-public network (NPN) measurement. A wireless communication node may send a first radio resource configuration (RRC) message including a first configuration that includes an indication of a non-public network (NPN) scope of first measurement to be performed by a wireless communication device to the wireless communication device. The wireless communication node may cause the wireless communication device to perform the first measurement according to the NPN scope.

14 Claims, 8 Drawing Sheets

(56) References Cited

FOREIGN PATENT DOCUMENTS

| | | | |
|---|---|---|---|
| WO | WO-2022/028345 | A1 | 2/2022 |
| WO | WO-2024/016160 | A1 | 1/2024 |

OTHER PUBLICATIONS

3rd Generation Partnership Project; Technical Specification Group Radio Access Network; NG-RAN; NG Application Protocol (NGAP) (Release 17 [sic, recte: 16]), 3GPP TS 38.413 V17.1.1 (Jun. 2022), Jun. 23, 2022, 21 pages.

Nokia, et al., "Logged MDT and other enhancements", 3GPP TSG-RAN WG2 Meeting #116 Electronic, R2-2110715, Nov. 12, 2021, Online (5 pages).

Notice of Reasons for Rejection for JP Appl. No. 2024-532800, dated Jun. 5, 2025 (with English translation, 10 pages).

ZTE Corporation et al., "On support MDT in NPN", 3GPP TSG RAN WG2#113-bis-e, R2-2104197, Apr. 20, 2021, Electronic meeting (2 pages).

International Search Report and Written Opinion for PCT Appl. No. PCT/CN2022/110677 mailed Dec. 27, 2022, (7 pages).

Extended European Search Report for EP Appl. No. 22953674.3, dated Dec. 5, 2024 (11 pages).

Decision to Grant a Patent on Japanese Patent Application No. 2024-532800, dated Jan. 28, 2026 (6 pages, including English translation).

* cited by examiner

SYSTEMS AND METHODS FOR NON-PUBLIC NETWORK (NPN) MEASUREMENT

CROSS-REFERENCE TO RELATED APPLICATION

This application claims the benefit of priority under 35 U.S.C. § 120 as a continuation of International Patent Application No. PCT/CN2022/110677, filed on Aug. 5, 2022, the disclosure of which is incorporated herein by reference in its entirety.

TECHNICAL FIELD

The disclosure relates generally to wireless communications, including but not limited to systems and methods for non-public network (NPN) measurement.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments (e.g., including combining features from various disclosed examples, embodiments and/or implementations) can be made while remaining within the scope of this disclosure.

At least one aspect is directed to a system, method, apparatus, or a computer-readable medium of the following. A wireless communication node (e.g., a gNB) may send a first radio resource configuration (RRC) message including a first configuration (e.g., a MDT and/or QoE configuration) that includes an indication of a non-public network (NPN) scope of first measurement (e.g., a MDT and/or QoE measurement) to be performed by a wireless communication device to the wireless communication device (e.g., a UE). The wireless communication node may cause the wireless communication device to perform the first measurement according to (e.g., within) the NPN scope.

In some embodiments, the first configuration may comprise a minimization of drive test (MDT) configuration or a quality of experience (QoE) configuration. The first measurement may comprise a MDT measurement or a QoE measurement. The wireless communication node may receive a first indication of the NPN scope of the first measurement from an operations, administration and maintenance (OAM) system. In certain embodiments, the NPN scope from the OAM system can be outside (a scope of measurement of) the MDT/QOE configuration.

In some embodiments, the NPN scope may comprise at least one of: a list of identifiers of stand-alone non-public networks (SNPNs), to indicate SNPNs allowed for the first measurement; or a list of identifiers of closed access groups (CAGs), to indicate public network integrated non-public networks (PNI-NPNs) allowed for the first measurement.

In some embodiments, the wireless communication node may select the wireless communication device from at least one candidate device, according to: a first indication of the NPN scope of the first measurement, from an operations, administration and maintenance (OAM) system, and a second indication of a respective NPN scope of the first measurement of each of the at least one candidate device, from an access and mobility management function (AMF). The wireless communication node may configure the NPN scope of the first measurement in the first configuration, according to: the first indication and the second indication. The wireless communication node may send the first configuration via a first radio resource configuration (RRC) message to the wireless communication device. In some embodiments, the wireless communication node may receive a second RRC message comprising: a result of the first measurement, and an identification of a stand-alone non-public network (SNPN) or closed access group (CAG) associated with the result from the wireless communication device.

In some embodiments, the wireless communication node may receive a new generation application protocol (NGAP) message associated with the wireless communication device from an access and mobility management function (AMF). The NGAP message may include at least a second indication of the NPN scope of the first measurement.

In some embodiments, the wireless communication node may receive a new generation application protocol (NGAP) message associated with the wireless communication device from an access and mobility management function (AMF). The NGAP message may comprise the first configuration. The first configuration may include the indication of the NPN scope of the first measurement. The first configuration may comprise a minimization of drive test (MDT) configuration. The first measurement may comprise a MDT measurement. In some embodiments, the first configuration may comprise a quality of experience (QoE) configuration. The first measurement may comprise a QoE measurement.

In some embodiments, the wireless communication node (e.g., NG-RAN node 1) may receive a quality of experience (QoE) configuration for the wireless communication device (e.g., a UE) from an access and mobility management function (AMF). The QoE configuration may comprise at least one of: an indication that the wireless communication device is in a high speed scenario, or an indication of area coverage comprising at least one of: an extended list of cell identifiers for large area scope, an extended list of tracking areas (TAs) for large area scope, an extended list of public land mobile network (PLMN) identifiers for large area scope, an extended list of stand-alone non-public network (SNPN) identifiers for large area scope, or an extended list of closed access group (CAG) identifiers for large area scope. A subsequent wireless communication node (e.g., NG-RAN node X) that is being accessed by the wireless communication device may send a new generation application protocol (NGAP) message to the AMF to request the QoE configuration. The AMF may retrieve a stored copy of the QoE configuration and may send the QoE configuration to the subsequent wireless communication node, responsive to the NGAP message.

In some embodiments, a wireless communication device (e.g., a UE) may receive a first radio resource configuration (RRC) message including a first configuration (e.g., a MDT and/or QoE configuration) that includes an indication of a NPN scope of first measurement (e.g., a MDT and/or QoE measurement) to be performed by the wireless communication device from a wireless communication node (e.g., a gNB). The wireless communication device may perform the first measurement according to the NPN scope.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
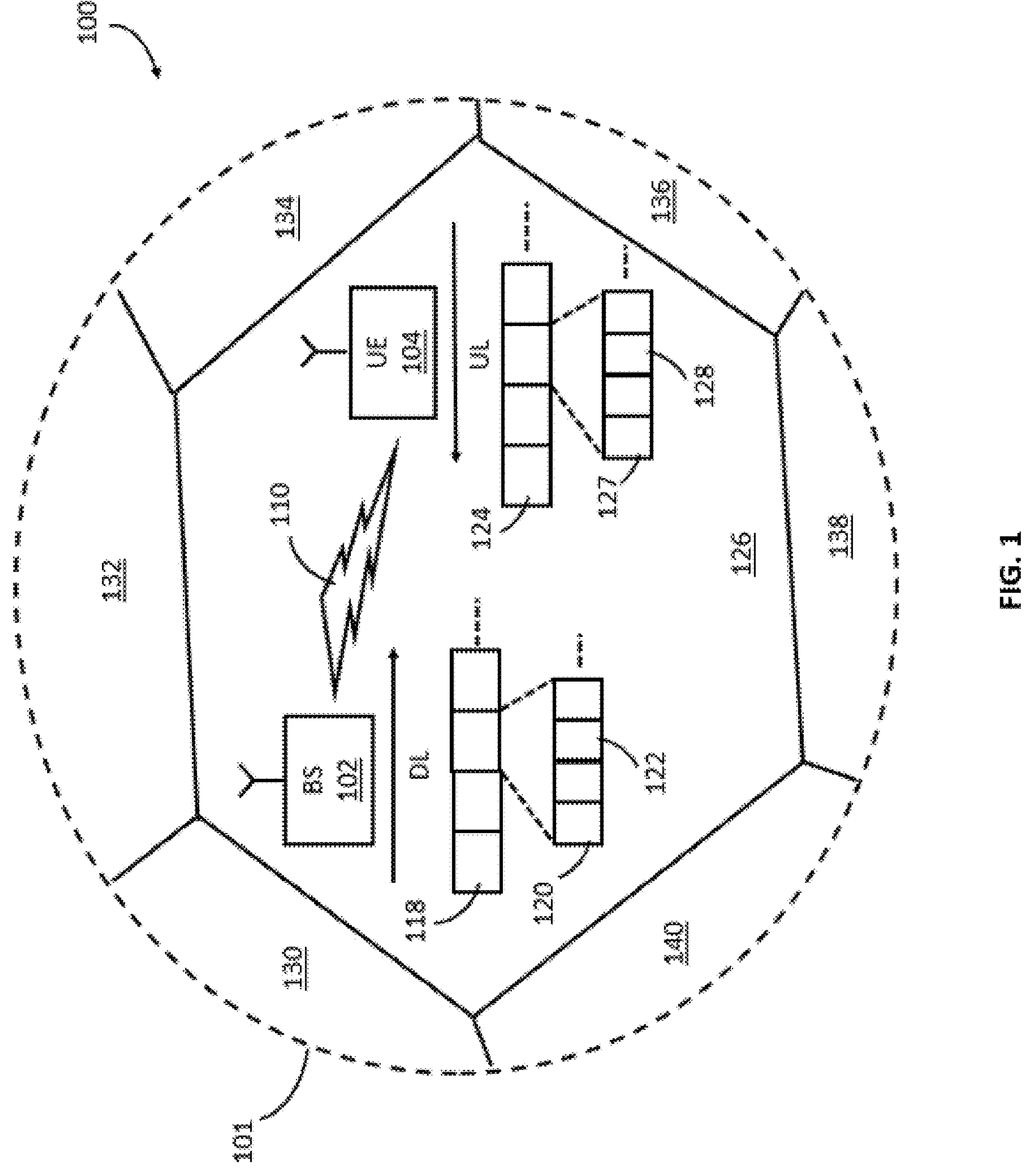
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
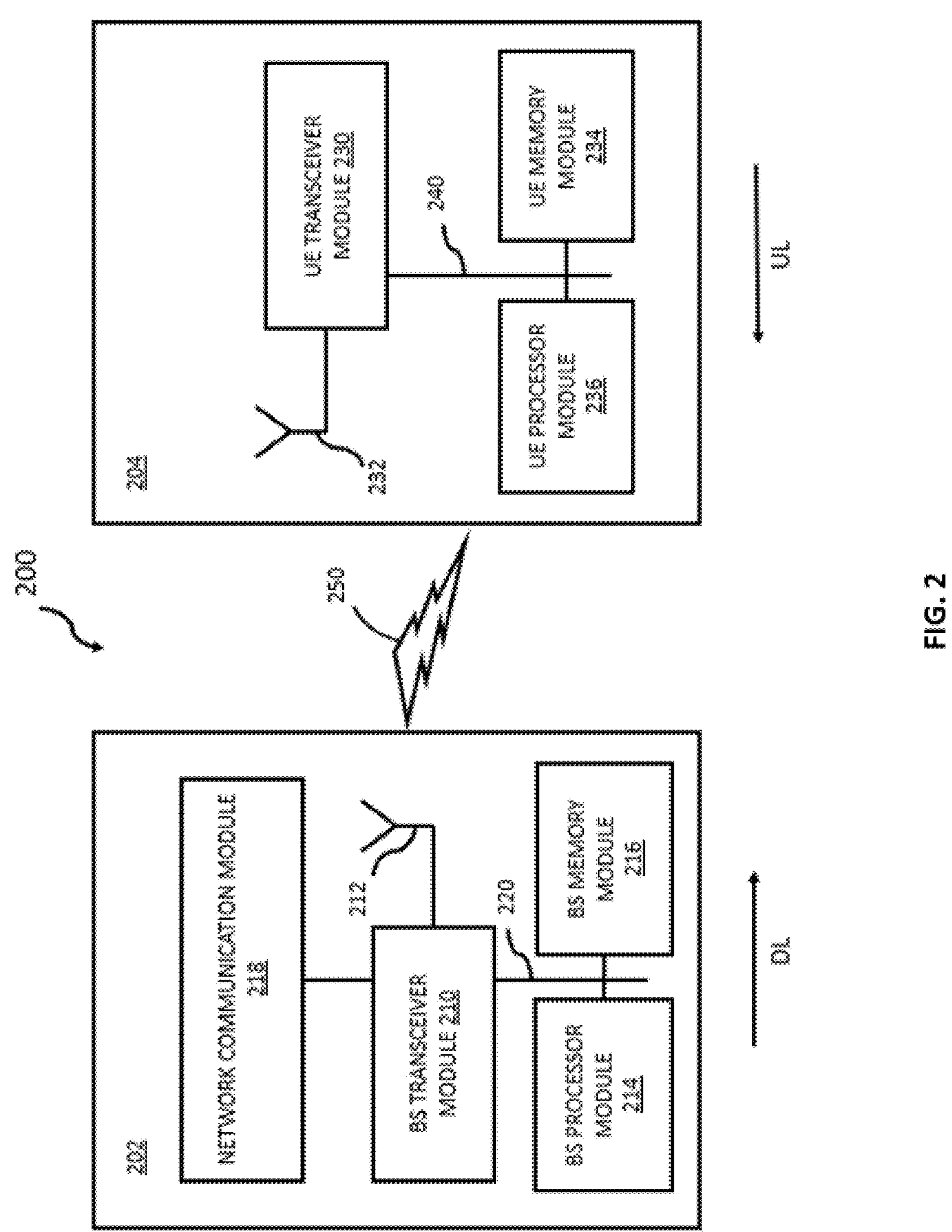
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Non-Public Network (NPN) Measurement

Due to benefits of understanding users' experience, quality of experience (QoE)/minimization of drive rest (MDT) measurement(s) have attracted operators/providers' attentions. The quality of experience (QoE) measurement can be defined based on different applications. In some embodiments, the QoE measurement may take place in an application layer of a UE. The QoE may include a measurement of throughput, data loss, and/or latency. The minimization of drive rest (MDT) measurement can be a mechanism designed/developed/adapted to enable operators to use user devices in a network to collect mobile network data, including radio measurements and/or location information.

Both of MDT and QoE measurements can be important for evaluating network quality and/or user service quality. Both types of measurements can be activated in a next generation radio access network (NG-RAN) either by a direct configuration from an operations, administration and maintenance (OAM) system (e.g., management-based QoE/MDT (M-QoE/MDT), M-QoE, or M-MDT), or by a signaling from a core network (e.g., signaling-based QoE/MDT (S-QoE/MDT), S-QoE, or S-MDT), containing UE-associated QoE/MDT configuration(s).

In a 5G/6G/other network, non-public network (NPN) feature can be implemented. A NPN can be a standalone non-public network (SNPN) or a public network integrated NPN (PNI-NPN). A SNPN can be a network deployed for non-public use which does not rely on network functions provided by a public land mobile network (PLMN). A PNI-NPN can be a network deployed for non-public use which relies on network functions provided by a PLMN. In a PNI-NPN, closed access groups (CAGs) may identify/include a group of subscribers which are permitted to access the cell supporting the CAGs. A PNI-NPN cell can support one or more CAGs.

A minimization of drive test (MDT) and/or a quality of experience (QoE) measurement may not support data collection in a non-public network (NPN). When a UE accesses the NPN or camps on a cell of the NPN, the QoE/MDT measurement may span some stand-alone non-public networks (SPNPs) and/or some different closed access groups (CAGs) in public network integrated non-public networks (PNI-NPNs). However, the UE may not know/identify/notice which SNPN/CAG measurements is to be collected.

Under an existing PNI-NPN, a cell under a PLMN can support up to 12 CAGs. However, existing MDT/QOE measurement(s) may only specify which PLMNs is to be measured by the UE. An operator may only be concern about/identify/notice measurements of some CAGs, which may cause cells under the PLMN that do not support the CAGs concerned by the operator to be measured. For a SNPN cell (whether an SNPN that is not shared with the PLMN, or a physical cell under a PLMN, can be shared by up to 12 SNPN networks), operators may only be concerned about/identify/notice measurements of some SNPNs for network optimizations of these SNPNs. As described above, it is possible for the UE to measure all SNPN networks, or the cells in a PLMN that do not support the CAG of the operator's interest. As a result, a UE's energy consumption and/or radio interface resource consumption may increase significantly.

Implementation Example 1: Management Based MDT for NPN

Figure 3:
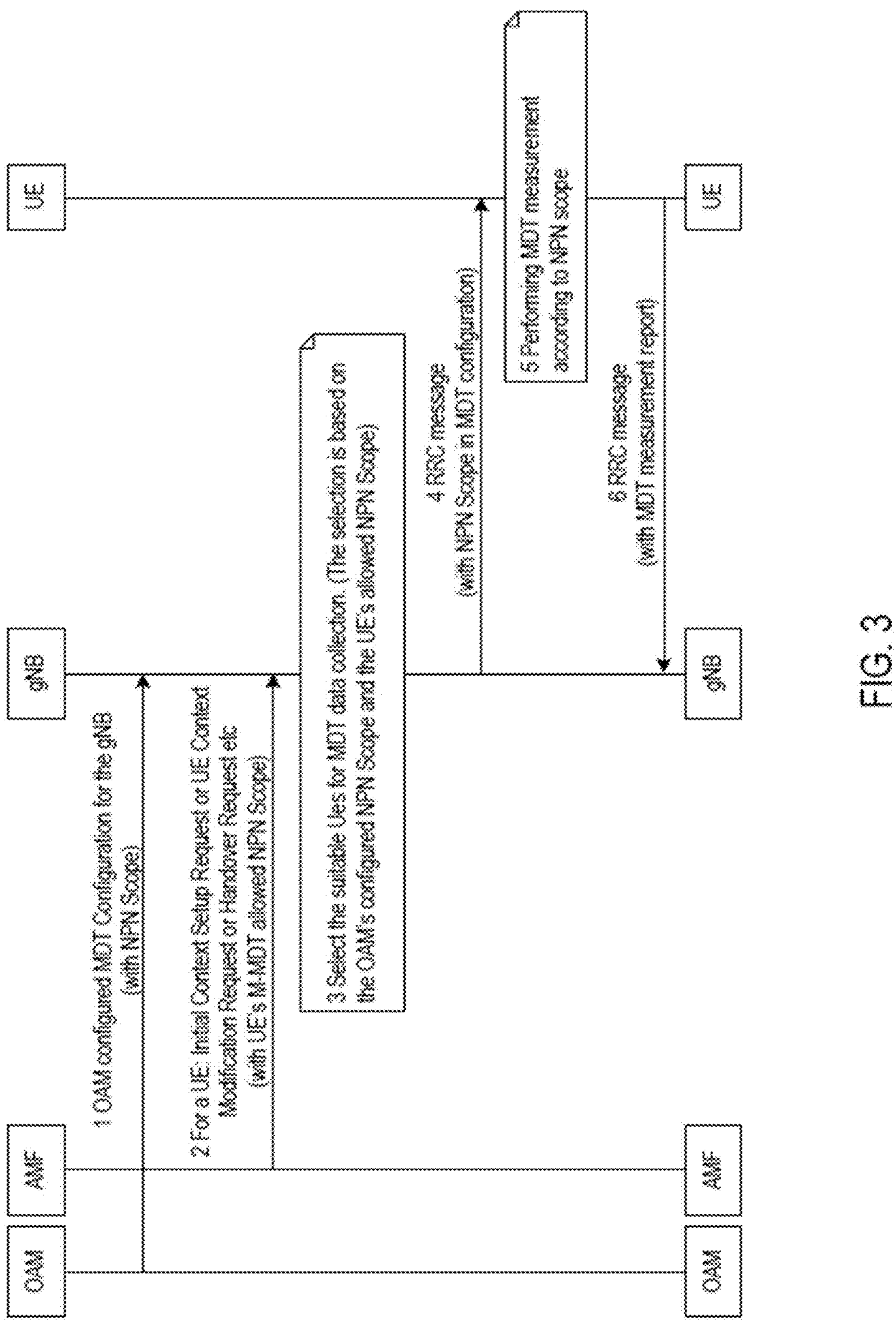
FIG. 3 illustrates a sequence diagram for management based MDT for non-public network (NPN) measurement, in accordance with some embodiments of the present disclosure.

FIG. 3 illustrates a sequence diagram for management based MDT for non-public network (NPN) measurement.

In step 1, an operations, administration and maintenance (OAM) system may send a minimization of drive test (MDT) configuration to a gNB to configure management based MDT function at the gNB. The MDT configuration may include parameters for configuring MDT measurements. In addition to the parameters in MDT configuration (e.g., list of measurements, reporting trigger, report interval, logging interval), the MDT configuration may also include an NPN scope (of measurement for the UE). The NPN scope may comprise at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a MDT and/or QoE measurement.

In step 2, when a UE accesses a non-public network (NPN) (e.g., a SNPN or a PNI-NPN), the gNB may receive a new generation application protocol (NGAP) message associated with the UE (e.g., an initial context setup request, a UE context modification request, or a handover request). The NGAP may comprise management-based MDT (M-MDT) allowed NPN scope information associated with the UE. The M-MDT allowed NPN scope information may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a MDT and/or QoE measurement. The gNB may receive multiple UEs' M-MDT allowed NPN scope information while the UEs access the NPN network.

In step 3, the gNB may select a suitable UE for collecting MDT data. The selection can be based on an OAM's configured NPN scope for the M-MDT and/or corresponding UE's M-MDT allowed NPN scope received from the AMF. There can be same parts between the corresponding selected UE's M-MDT allowed NPN scope and the OAM's configured NPN scope for the M-MDT. The gNB may configure/set/align the NPN scope in a MDT configuration associated with the UE according to the OAM's configured NPN scope for the M-MDT and/or the corresponding UE's M-MDT allowed NPN scope received from the AMF. The NPN scope (e.g., that is set/configured) can be in both the OAM's configured NPN scope for the M-MDT and the corresponding UE's M-MDT allowed NPN scope received from the AMF. In some embodiments, the gNB may configure other parameters of MDT configuration for the UE according to the OAM's configured MDT configuration for the gNB in step 1.

In step 4, the gNB may send a radio resource configuration (RRC) message to activate the UE's MDT measurement. The RRC message may comprise a MDT configuration for the UE. The MDT configuration may comprise a NPN scope (e.g., indicating the scope of the first measurement). The NPN scope may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a MDT and/or QoE measurement.

In step 5, while the UE accesses the NPN network or camps on the NPN network, the UE may perform a MDT measurement according to the received NPN scope. The UE may not perform MDT measurement outside an area/scope identified by the NPN scope.

In step 6, the UE may send a RRC message to report MDT measurement results. An associated SNPN identifier or CAG identifier for specific NPN measurement results can be included.

Implementation Example 2: Signaling Based MDT for NPN

Figure 4:
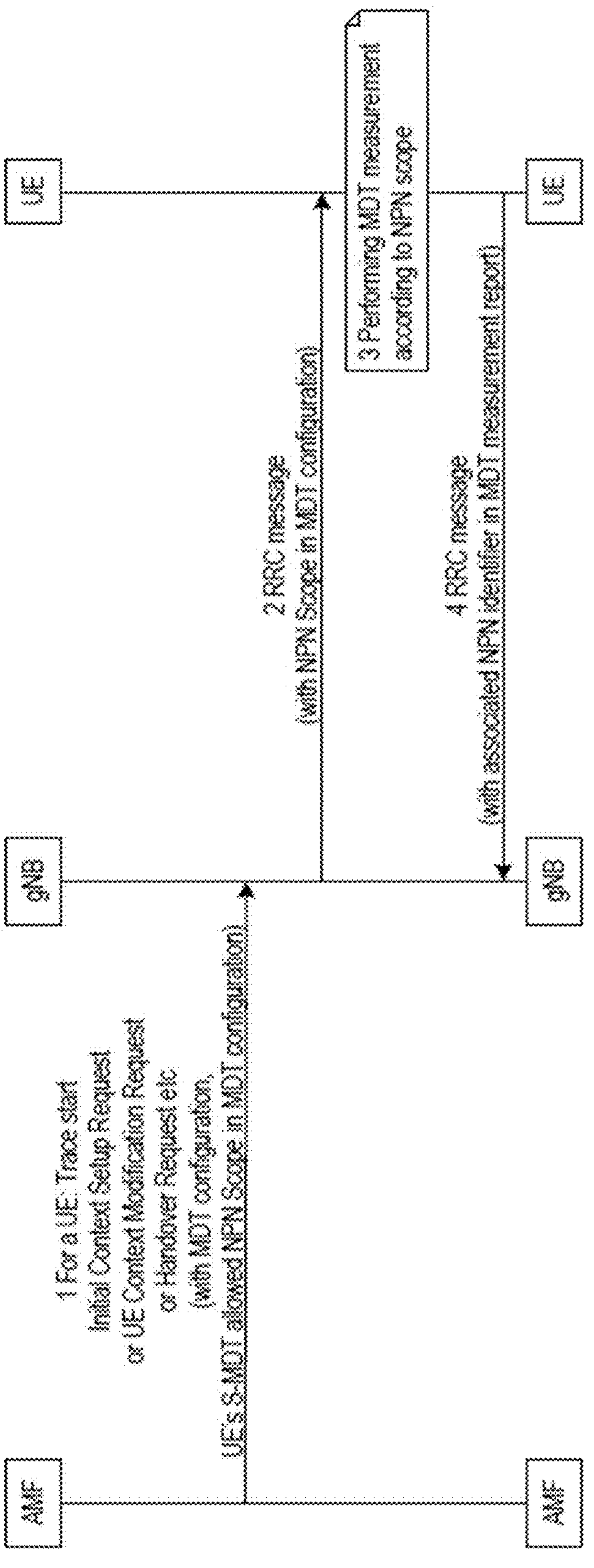
FIG. 4 illustrates a sequence diagram for signaling based MDT for non-public network (NPN) measurement, in accordance with some embodiments of the present disclosure.

FIG. 4 illustrates a sequence diagram for signaling based MDT for non-public network (NPN) measurement.

In step 1, when a UE accesses a non-public network (NPN) (e.g., SNPN or PNI-NPN), a gNB may receive a new generation application protocol (NGAP) message for MDT activation associated with the UE (e.g., an initial context setup request, a UE context modification request, a handover request, or a trace start). The NGAP message may comprise a MDT configuration. The MDT configuration may include signaling based MDT (S-MDT) allowed NPN scope information. The S-MDT allowed NPN scope information may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a MDT and/or QoE measurement. The S-MDT allowed NPN scope information in the corresponding NGAP message can be outside the MDT configuration.

In step 2, the gNB may configure the NPN scope of MDT measurement associated with a UE according to the received S-MDT allowed NPN scope information. The gNB may set/configure/align the NPN scope of MDT measurement associated the UE to be same with the received S-MDT allowed NPN scope. The gNB may send a radio resource configuration (RRC) message to the UE. The RRC message may comprise a MDT configuration associated with the UE to activate UE's MDT measurements. The MDT configuration may comprise the NPN scope. The NPN scope may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a MDT and/or QoE measurement.

In step 3, while the UE accesses the NPN network or camps on the NPN network, the UE may perform a MDT measurement according to the received NPN scope. The UE may not perform a MDT measurement outside the area/scope identified/covered by the NPN scope.

In step 4, the UE may send a RRC message to report MDT measurement results. An associated SNPN identifier or a CAG identifier for specific NPN measurement results can be included.

Implementation Example 3: Management Based QoE for NPN

Figure 5:
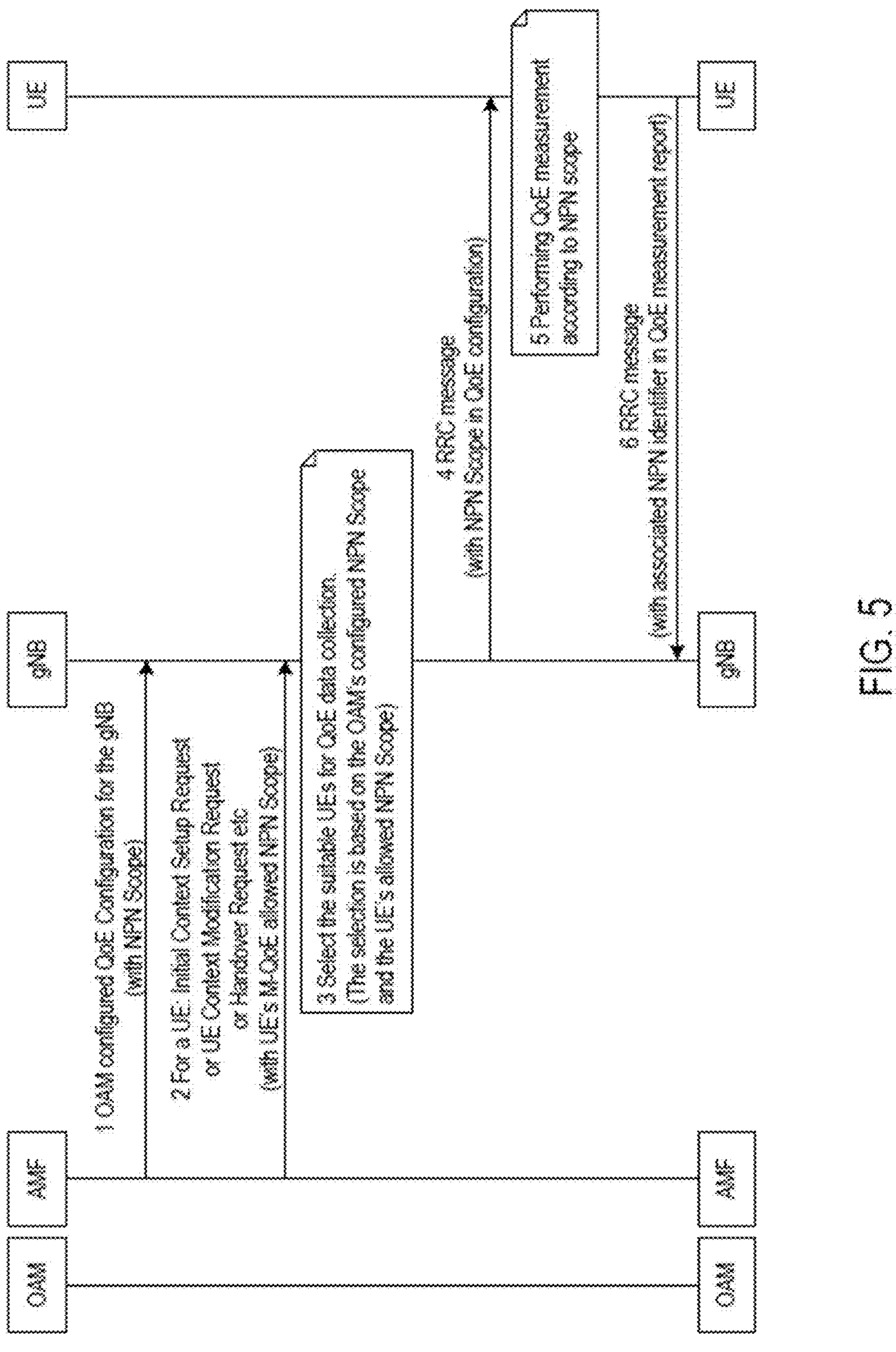
FIG. 5 illustrates a sequence diagram for management based QoE for non-public network (NPN) measurement, in accordance with some embodiments of the present disclosure.

FIG. 5 illustrates a sequence diagram for management based QoE for non-public network (NPN) measurement.

In step 1, an operations, administration and maintenance (OAM) system may send a quality of experience (QoE) configuration to a gNB to configure management based QoE function at the gNB. The QoE configuration may include parameters for configuring QoE measurements. In addition to the parameters in QoE configuration (e.g., list of measurements, reporting trigger, report interval, logging interval, or QoE metrics), the QoE configuration may also include an NPN scope (of measurement for the UE). The NPN scope may comprise at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a QoE and/or MDT measurement.

In step 2, when a UE accesses a non-public network (NPN) (e.g., a SNPN or a PNI-NPN), the gNB may receive a new generation application protocol (NGAP) message associated with the UE (e.g., an initial context setup request, a UE context modification request, or a handover request). The NGAP may comprise management-based QoE (M-QoE) allowed NPN scope information associated with the UE. The M-QoE allowed NPN scope information may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a QoE and/or MDT measurement. The gNB may receive multiple UEs' M-QoE allowed NPN scope information while the UEs access the NPN network.

In step 3, the gNB may select a suitable UE for collecting QoE data. The selection can be based on an OAM's configured NPN scope for the M-QoE and/or corresponding UE's M-QoE allowed NPN scope received from the AMF. There can be same parts between the corresponding selected UE's M-QoE allowed NPN scope and the OAM's configured NPN scope for the M-QoE. The gNB may configure/set/align the NPN scope in a QoE configuration associated the UE according to the OAM's configured NPN scope for the M-QoE and/or the corresponding UE's M-QoE allowed NPN scope received from the AMF. The set NPN scope can be in both the OAM's configured NPN scope for the M-QoE and the corresponding UE's M-QoE allowed NPN scope received from the AMF. In some embodiments, the gNB may configure other parameters of QoE configuration for the UE according to the OAM's configured QoE configuration for the gNB in step 1.

In step 4, the gNB may send a radio resource configuration (RRC) message to activate the UE's QoE measurement. The RRC message may comprise a QoE configuration for the UE. The QoE configuration may comprise a NPN scope. The NPN scope may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a QoE and/or MDT measurement.

In step 5, while the UE accesses the NPN network or camps on the NPN network, the UE may perform a QoE measurement according to the received NPN scope. The UE may not perform QoE measurement outside an area/scope identified/specified by the NPN scope.

In step 6, the UE may send a RRC message to report QoE measurement results. An associated SNPN identifier or CAG identifier for specific NPN measurement results can be included.

Implementation Example 4: Signaling Based QoE for NPN

Figure 6:
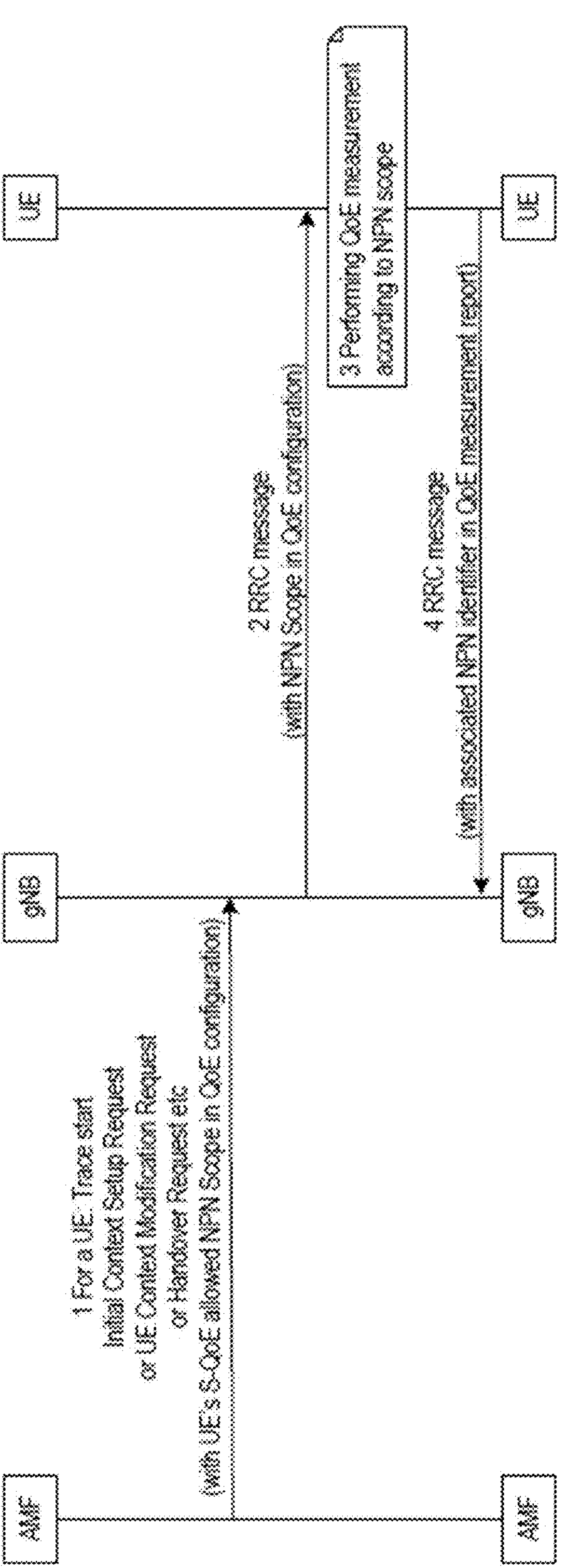
FIG. 6 illustrates a sequence diagram for signaling based QoE for non-public network (NPN) measurement, in accordance with some embodiments of the present disclosure.

FIG. 6 illustrates a sequence diagram for signaling based QoE for non-public network (NPN) measurement.

In step 1, when a UE accesses a non-public network (NPN) (e.g., SNPN or PNI-NPN), a gNB may receive a new generation application protocol (NGAP) message for QoE activation associated with the UE (e.g., an initial context setup request, a UE context modification request, a handover request, or a trace start). The NGAP message may comprise a QoE configuration. The QoE configuration may include signaling based QoE (S-QoE) allowed NPN scope information. The S-QoE allowed NPN scope information may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a QoE and/or MDT measurement. The S-QoE allowed NPN scope information in the corresponding NGAP message can be outside the QoE configuration.

In step 2, the gNB may configure the NPN scope of QoE measurement associated with a UE according to the received S-QoE allowed NPN scope information. The gNB may set/align/configure the NPN scope of QoE measurement associated with the UE, to be same as the received S-QoE allowed NPN scope. The gNB may send a radio resource configuration (RRC) message to the UE. The RRC message may comprise a QoE configuration associated with the UE to activate UE's QoE measurements. The QoE configuration may comprise the NPN scope. The NPN scope may include at least one of: a list of identifiers of stand-alone non-public networks (SNPNs), to indicate SNPNs allowed for a first measurement; or a list of identifiers of closed access groups (CAGs), to indicate public network integrated non-public networks (PNI-NPNs) allowed for the first measurement. The first measurement can be a QoE and/or MDT measurement.

In step 3, while the UE accesses the NPN network or camps on the NPN network, the UE may perform a QoE measurement according to the received NPN scope. The UE may not perform a QoE measurement outside an area/scope identified by the NPN scope.

In step 4, the UE may send a RRC message to report QoE measurement results. An associated SNPN identifier or a CAG identifier for specific NPN measurement results can be included.

Figure 7:
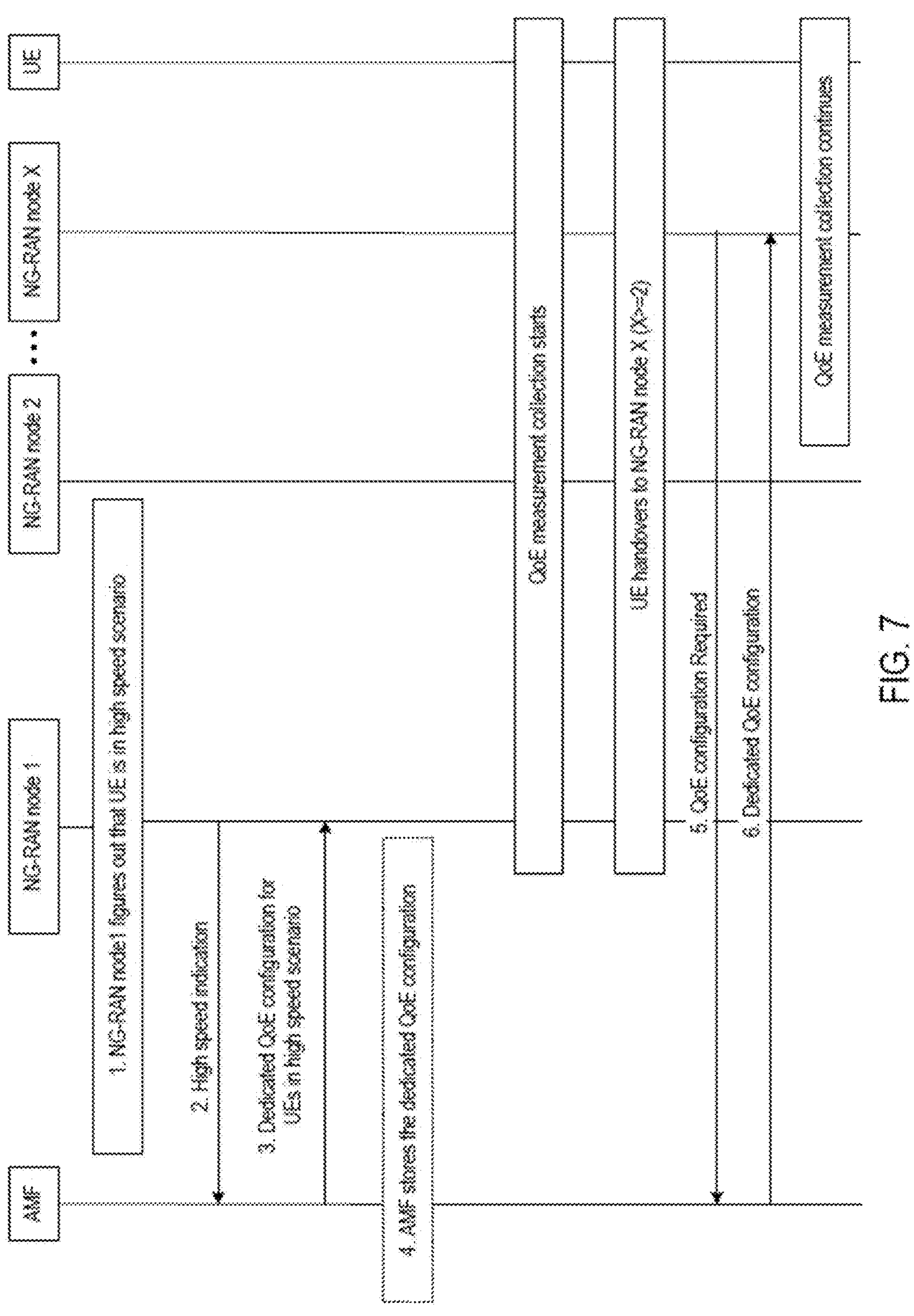
FIG. 7 illustrates a sequence diagram for signaling based QoE configuration (e.g., in a high speed train context), in accordance with some embodiments of the present disclosure.

Implementation Example 5: Signaling Based QoE Configuration for High Speed Train FIG. 7 illustrates a sequence diagram for signaling based QoE configuration (e.g., for a high speed train/transport context or scenario). In a high speed train scenario for instance, a UE may experience frequent handover while traveling at high speed. In FIG. 7, a NG-RAN node 1 (e.g., gNB 1) may denote a first NG-RAN node which the UE connects to in the high speed train. A NG-RAN node 2 (e.g., gNB 2) can be a second node which the UE moves to, while traveling in the high speed train. A NG-RAN node X (e.g., gNB X) can be a number X NG-RAN node which UE moves to in the high speed train (X>=2) correspondingly.

In step 1, a NG-RAN node 1 may figure out/determine that a UE is in a high speed scenario according to measurement results collected from a RAN side.

In step 2, the NG-RAN node 1 may send a high speed indication to an access and mobility management function (AMF) to indicate that the UE is in a high speed scenario (e.g., moving at high speed, for instance at a speed higher than a defined threshold). The AMF may prepare a QoE configuration for a high speed train.

In step 3, the AMF may send a dedicated QoE configuration associated with the UE in the high speed train scenario to the NG-RAN node 1. The dedicated QoE configuration may include at least one of: an indication that the wireless communication device is in a high speed scenario, or an indication of area coverage/scope comprising at least one of: an extended list of cell identifiers for large area scope (e.g., some or all area of the high speed train), an extended list of tracking areas (TAs) for large area scope (e.g., some or all area of the high speed train), an extended list of public land mobile network (PLMN) identifiers for large area scope (e.g., some or all area of the high speed train), an extended list of stand-alone non-public network (SNPN) identifiers for large area scope (e.g., some or all area of the high speed train), or an extended list of closed access group (CAG) identifiers for large area scope (e.g., some or all area of the high speed train). The indication of area coverage/scope may cover some or all area along the high speed train. The large area scope can be a scope and/or an area that meets and/or exceeds a defined/configured/standard threshold. In some embodiments, the large area scope can be a scope within a defined/configured/standard range.

In step 4 (optional), the AMF may store the dedicated QoE configuration.

After steps 1-4, the NG-RAN node 1 can send the dedicated QoE configuration to the UE. The dedicated QoE configuration may comprise a dedicate area scope to the UE. The UE may perform a QoE measurement according to the dedicated area/scope. The UE may not perform a QoE measurement outside the area/scope identified by the dedicate area scope. When the UE moves with the high speed train, the UE may experience frequent handover (e.g., the UE moves to NG-RAN node X (X>=2)).

In step 5, in order to reduce consumption of handover signaling resources, a source NG-RAN node may not carry a QoE Configuration to a target NG-RAN node X in the handover request message. The NG-RAN node X may send a new generation application protocol (NGAP) message (e.g., a QoE configuration request message) to the AMF to request the QoE configuration associated with the UE.

In step 6, the AMF may respond to the QoE configuration request message by sending the stored dedicated QoE configuration to the NG-RAN node X.

After step 6, the NG-RAN node X may be aware of the QoE configuration at the UE side. The QoE measurement continuity can be supported for the UE(s) in high speed scenario.

It should be understood that one or more features from the above implementation examples are not exclusive to the specific implementation examples, but can be combined in any manner (e.g., in any priority and/or order, concurrently or otherwise).

Figure 8:
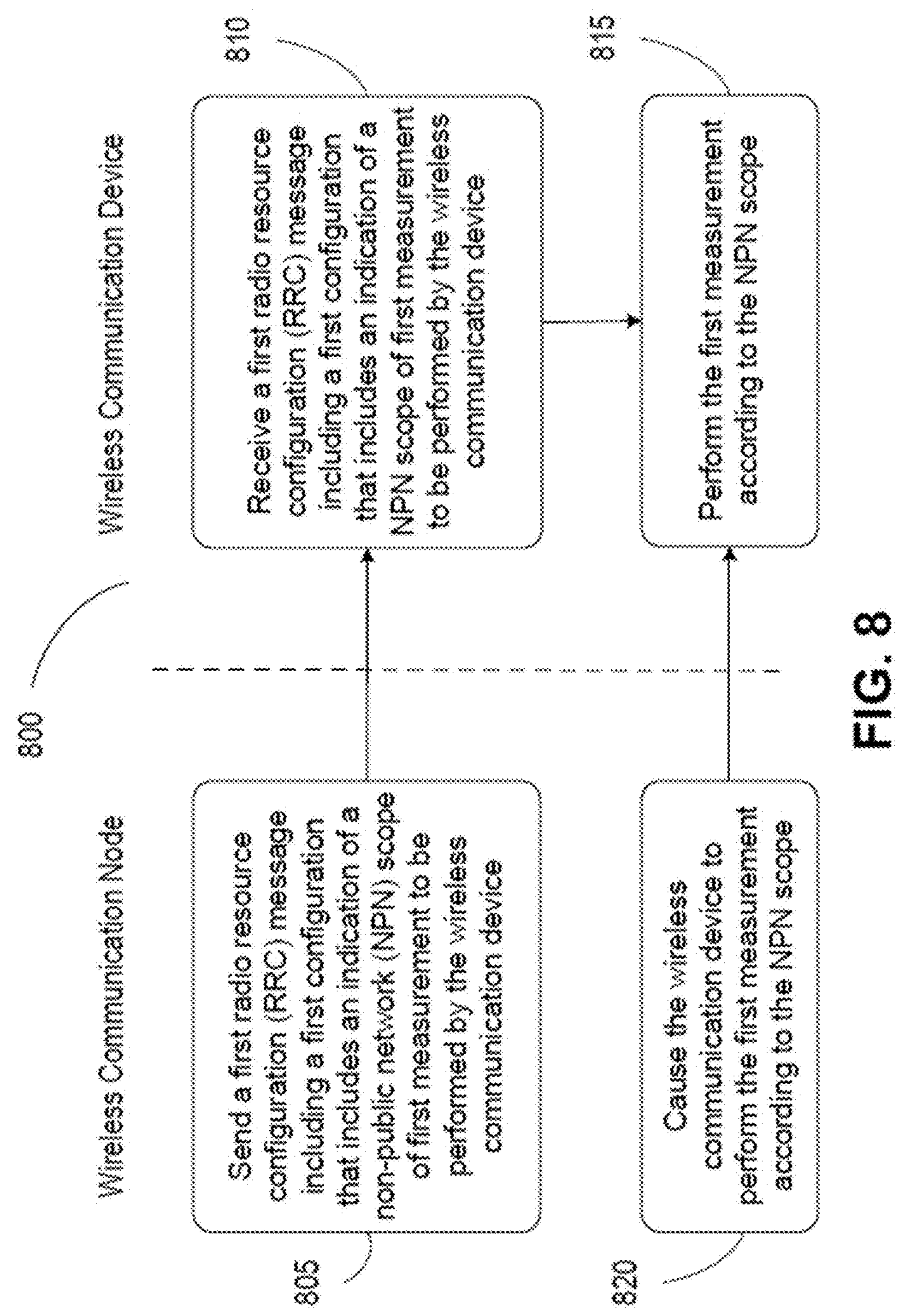
FIG. 8 illustrates a flow diagram for non-public network (NPN) measurement, in accordance with an embodiment of the present disclosure.

FIG. 8 illustrates a flow diagram of a method 800 for non-public network (NPN) measurement. The method 800 may be implemented using any one or more of the components and devices detailed herein in conjunction with FIGS. 1-2. In overview, the method 800 may be performed by a wireless communication node, in some embodiments. Additional, fewer, or different operations may be performed in the method 800 depending on the embodiment. At least one aspect of the operations is directed to a system, method, apparatus, or a computer-readable medium.

A wireless communication node (e.g., a gNB) may send a first radio resource configuration (RRC) message including a first configuration (e.g., a MDT and/or QoE configuration) that includes an indication of a non-public network (NPN) scope of first measurement (e.g., a MDT and/or QoE measurement) to be performed by a wireless communication device to the wireless communication device (e.g., a UE). The wireless communication node may cause the wireless communication device to perform the first measurement according to the NPN scope.

In some embodiments, the first configuration may comprise a minimization of drive test (MDT) configuration or a quality of experience (QoE) configuration. The first measurement may comprise a MDT measurement or a QoE measurement. The wireless communication node may receive a first indication of the NPN scope of the first measurement from an operations, administration and maintenance (OAM) system.

In some embodiments, the NPN scope may comprise at least one of: a list of identifiers of stand-alone non-public networks (SNPNs), to indicate SNPNs allowed for the first measurement; or a list of identifiers of closed access groups (CAGs), to indicate public network integrated non-public networks (PNI-NPNs) allowed for the first measurement.

In some embodiments, the wireless communication node may select the wireless communication device from at least one candidate device, according to: a first indication of the NPN scope of the first measurement, from an operations, administration and maintenance (OAM) system, and a second indication of a respective NPN scope of the first measurement of each of the at least one candidate device, from an access and mobility management function (AMF). The wireless communication node may configure/specify/define the NPN scope of the first measurement in the first configuration, according to: the first indication and the second indication. The wireless communication node may send the first configuration via a first radio resource configuration (RRC) message to the wireless communication device. In some embodiments, the wireless communication node may receive a second RRC message comprising: a result of the first measurement, and an identification of a stand-alone non-public network (SNPN) or closed access group (CAG) associated with the result from the wireless communication device.

In some embodiments, the wireless communication node may receive a new generation application protocol (NGAP) message associated with the wireless communication device from an access and mobility management function (AMF). The NGAP message may include at least a second indication of the NPN scope of the first measurement.

In some embodiments, the wireless communication node may receive a new generation application protocol (NGAP) message associated with the wireless communication device from an access and mobility management function (AMF). The NGAP message may comprise the first configuration. The first configuration may include the indication of the NPN scope of the first measurement. The first configuration may comprise a minimization of drive test (MDT) configuration. The first measurement may comprise a MDT measurement. In some embodiments, the first configuration may comprise a quality of experience (QoE) configuration. The first measurement may comprise a QoE measurement.

In some embodiments, the wireless communication node (e.g., NG-RAN node 1) may receive a quality of experience (QoE) configuration for the wireless communication device (e.g., a UE) from an access and mobility management function (AMF). The QoE configuration may comprise at least one of: an indication that the wireless communication device is in a high speed scenario, or an indication of area coverage comprising at least one of: an extended list of cell identifiers for large area scope, an extended list of tracking areas (TAs) for large area scope, an extended list of public land mobile network (PLMN) identifiers for large area scope, an extended list of stand-alone non-public network (SNPN) identifiers for large area scope, or an extended list of closed access group (CAG) identifiers for large area scope. A subsequent wireless communication node (e.g., NG-RAN node X) that is being accessed by the wireless communication device may send a new generation application protocol (NGAP) message to the AMF to request the QoE configuration. The AMF may retrieve/access a stored copy of the QoE configuration and may send the QoE configuration to the subsequent wireless communication node, responsive to the NGAP message.

In some embodiments, a wireless communication device (e.g., a UE) may receive a first radio resource configuration (RRC) message including a first configuration (e.g., MDT or QoE configuration) that includes an indication of a NPN scope of first measurement (e.g., MDT or QoE measurement) to be performed by the wireless communication device from a wireless communication node (e.g., a gNB).

The wireless communication device may perform the first measurement according to (e.g., within, or without exceeding) the NPN scope.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:

sending, by a wireless communication node to a wireless communication device, a first radio resource configuration (RRC) message including a second minimization of drive test (MDT) configuration based on a next generation application protocol (NGAP) message received by the wireless communication node from an access and mobility management function (AMF), the NGAP message providing a first MDT configuration, wherein the second MDT configuration includes an indication of a non-public network (NPN) scope of MDT measurement to be performed by the wireless communication device; and causing the wireless communication device to perform the MDT measurement according to the NPN scope.

2. The method of claim 1, wherein the NPN scope comprises at least one of:

a list of identifiers of stand-alone non-public networks (SNPNs), to indicate SNPNs allowed for the MDT measurement; or a list of identifiers of closed access groups (CAGs), to indicate public network integrated non-public networks (PNI-NPNs) allowed for the MDT measurement.

3. The method of claim 1, comprising:

receiving, by the wireless communication node from the wireless communication device, a second RRC message comprising a result of the MDT measurement, the MDT measurement performed according to the NPN scope.

4. A method, comprising:

receiving, by a wireless communication device from a wireless communication node, a first radio resource configuration (RRC) message including a second minimization of drive test (MDT) configuration based on a next generation application protocol (NGAP) message received by the wireless communication node from an access and mobility management function (AMF), the NGAP message providing a first MDT configuration, wherein the second MDT configuration includes an indication of a non-public network (NPN) scope of MDT measurement; and performing, by the wireless communication device, the MDT measurement according to the NPN scope.

5. The method of claim 4, wherein the NPN scope comprises at least one of:

a list of identifiers of stand-alone non-public networks (SNPNs), to indicate SNPNs allowed for the MDT measurement; or a list of identifiers of closed access groups (CAGs), to indicate public network integrated non-public networks (PNI-NPNs) allowed for the MDT measurement.

6. The method of claim 4, wherein performing the MDT measurement according to the NPN scope comprises: performing the MDT measurement within an area indicated by the NPN scope.

7. The method of claim 4, comprising:

sending, by the wireless communication device to the wireless communication node, a second RRC message comprising a result of the MDT measurement, the MDT measurement performed according to the NPN scope.

8. A wireless communication node, comprising:

at least one processor configured to:

send, via a transmitter to a wireless communication device, a first radio resource configuration (RRC) message including a second minimization of drive test (MDT) configuration based on a next generation application protocol (NGAP) message received by the wireless communication node from an access and mobility management function (AMF), the NGAP message providing a first MDT configuration, wherein the second MDT configuration includes an indication of a non-public network (NPN) scope of MDT measurement to be performed by the wireless communication device, wherein the wireless communication device performs the MDT measurement according to the NPN scope.

9. The wireless communication node of claim 8, wherein the NPN scope comprises at least one of:

a list of identifiers of stand-alone non-public networks (SNPNs), to indicate SNPNs allowed for the MDT measurement; or a list of identifiers of closed access groups (CAGs), to indicate public network integrated non-public networks (PNI-NPNs) allowed for the MDT measurement.

10. The wireless communication node of claim 8, wherein the at least one processor is configured to:

receive, via a receiver from the wireless communication device, a second RRC message comprising a result of the MDT measurement, the MDT measurement performed according to the NPN scope.

11. A wireless communication device, comprising:

at least one processor configured to:

receive, via a receiver a from a wireless communication node, a first radio resource configuration (RRC) message including a second minimization of drive test (MDT) configuration based on a next generation application protocol (NGAP) message received by the wireless communication node from an access and mobility management function (AMF), the NGAP message providing a first MDT configuration, wherein the second MDT configuration includes an indication of a non-public network (NPN) scope of MDT measurement; and perform the MDT measurement according to the NPN scope.

12. The wireless communication device of claim 11, wherein the NPN scope comprises at least one of:

a list of identifiers of stand-alone non-public networks (SNPNs), to indicate SNPNs allowed for the MDT measurement; or a list of identifiers of closed access groups (CAGs), to indicate public network integrated non-public networks (PNI-NPNs) allowed for the MDT measurement.

13. The wireless communication device of claim 11, wherein the at least one processor is configured to perform the MDT measurement within an area indicated by the NPN scope.

14. The wireless communication device of claim 11, wherein the at least one processor is configured to:

send, via a transmitter to the wireless communication node, a second RRC message comprising a result of the MDT measurement, the MDT measurement performed according to the NPN scope.

* * * * *